US 8,140,266 B2

(12) United States Patent
Nakamura et al.

(10) Patent No.: US 8,140,266 B2
(45) Date of Patent: Mar. 20, 2012

(54) VEHICLE POSITIONING INFORMATION UPDATING SYSTEM

(75) Inventors: Motohiro Nakamura, Okazaki (JP);
Kiyokazu Okada, Nishikamo-gun (JP);
Hidenobu Suzuki, Ann Arbor, MI (US);
Masaki Nakamura, Okazaki (JP);
Makoto Hasunuma, Nagoya (JP)

(73) Assignees: Toyota Jidosha Kabushiki Kaisha, Toyota-shi (JP); Aisin AW Co., Ltd., Anjyo-shi (JP)

( * ) Notice: Subject to any disclaimer, the term of this patent is extended or adjusted under 35 U.S.C. 154(b) by 999 days.

(21) Appl. No.: 12/066,907

(22) PCT Filed: May 15, 2007

(86) PCT No.: PCT/JP2007/059978
§ 371 (c)(1),
(2), (4) Date: Mar. 14, 2008

(87) PCT Pub. No.: WO2007/132859
PCT Pub. Date: Nov. 22, 2007

(65) Prior Publication Data
US 2010/0082238 A1    Apr. 1, 2010

(30) Foreign Application Priority Data
May 16, 2006 (JP) .................................. 2006-136934

(51) Int. Cl.
*G01C 21/30* (2006.01)
(52) U.S. Cl. ....................................................... 701/495
(58) Field of Classification Search .................. 348/116; 701/221, 495
See application file for complete search history.

(56) References Cited

U.S. PATENT DOCUMENTS

| | | | | | |
|---|---|---|---|---|---|
| 3,305,671 | A | * | 2/1967 | Manoni, Jr. | 701/226 |
| 4,359,733 | A | * | 11/1982 | O'Neill | 342/36 |
| 5,485,384 | A | * | 1/1996 | Falconnet | 701/207 |
| 5,826,212 | A | * | 10/1998 | Nagai | 701/208 |
| 5,883,739 | A | * | 3/1999 | Ashihara et al. | 359/462 |
| 5,894,323 | A | * | 4/1999 | Kain et al. | 348/116 |
| 5,904,725 | A | * | 5/1999 | Iisaka et al. | 701/207 |
| 6,018,692 | A | * | 1/2000 | Shimizu et al. | 701/41 |
| 6,018,697 | A | * | 1/2000 | Morimoto et al. | 701/209 |
| 6,285,317 | B1 | * | 9/2001 | Ong | 342/357.57 |
| 6,577,334 | B1 | * | 6/2003 | Kawai et al. | 348/148 |
| 6,704,619 | B1 | * | 3/2004 | Coleman et al. | 700/245 |
| 7,366,595 | B1 | * | 4/2008 | Shimizu et al. | 701/301 |
| 7,405,746 | B2 | * | 7/2008 | Wakimoto et al. | 348/116 |
| 7,720,436 | B2 | * | 5/2010 | Hamynen et al. | 455/13.1 |
| 7,756,640 | B2 | * | 7/2010 | Ueyama et al. | 701/221 |

(Continued)

FOREIGN PATENT DOCUMENTS

| | | |
|---|---|---|
| JP | 10 181482 | 7/1998 |
| JP | 2005 147713 | 6/2005 |
| JP | 2005 265494 | 9/2005 |

*Primary Examiner* — Mark Hellner
*Assistant Examiner* — Ari M Diacou
(74) *Attorney, Agent, or Firm* — Oblon, Spivak, McClelland, Maier & Neustadt, L.L.P.

(57) ABSTRACT

Based on positioning accuracy of an own vehicle required for appropriately carrying out assistance control carried out according to a position of the own vehicle, an execution condition for map matching correcting the position of the own vehicle is set. Specifically, setting is made in such a manner that, as the positioning accuracy is higher and an error thereof is smaller, an execution frequency of map matching becomes higher. Then, map matching is carried out according to the thus-set execution condition.

7 Claims, 5 Drawing Sheets

U.S. PATENT DOCUMENTS

| | | | |
|---|---|---|---|
| 7,840,326 B1* | 11/2010 | Yamada | 701/49 |
| 2006/0058953 A1* | 3/2006 | Cooper et al. | 701/208 |
| 2006/0178816 A1* | 8/2006 | Dickin et al. | 701/207 |
| 2006/0235581 A1* | 10/2006 | Petillon | 701/3 |
| 2006/0274146 A1* | 12/2006 | Ohashi et al. | 348/113 |
| 2006/0293845 A1* | 12/2006 | Watanabe | 701/208 |
| 2008/0249705 A1* | 10/2008 | Matsuda | 701/208 |
| 2010/0131195 A1* | 5/2010 | Jung et al. | 701/208 |
| 2011/0060524 A1* | 3/2011 | Miyajima et al. | 701/300 |

* cited by examiner

VEHICLE POSITIONING INFORMATION UPDATING SYSTEM

TECHNICAL FIELD

The present invention relates to a vehicle positioning information updating system, and in particular, to a vehicle positioning information updating system for updating positioning information concerning positioning of an own vehicle mounting an assistance unit which carries out assistance control according to the own vehicle position.

BACKGROUND ART

In the prior art, a map database such as a CD or DVD storing road map data used for a navigation unit which carries out routing assistance or such, and a system for updating control data of a vehicle, are known (for example, see a patent document 1). By this system, it is possible to respond to a temporal change in the map data, thus it is possible to prevent routing assistance or such from being carried out according to original old map data, as much as possible. Further, since it is possible to carry out appropriate assistance control according to a unique position of each vehicle, it is possible to prevent optimum assistance control from not being carried out.
Patent Document 1: Japanese Laid-Open Patent Application No. 10-181482

DISCLOSURE OF THE INVENTION

Problem to be Solved by the Invention

However, in the system in the prior art mentioned above, updating of map data is carried out regularly or irregularly. However, the updating may not be carried out according to repair of a road or such. Therefore, even when updating of a map database is carried out, the thus-updated map data may not correspond to a condition of a road for which repair has been made. Therefore, routing assistance or various types of assistance control in the vehicle may not be carried out appropriately. Further, accuracy of route map data stored in the map database or a position of the own vehicle detected, degrade, as time has elapsed or a moving distance of the vehicle becomes longer, after the updating. Therefore, when next updating is not carried out, assistance control of the vehicle with the use of the road map data and the own vehicle position, may not be carries out appropriately, due to the degradation in the accuracy.

The present invention has been devised in consideration of the above-described point, and an object of the present invention is to provide a vehicle positioning information updating system by which assistance control can be appropriately carried out as a result of positioning information such as road map data or an own vehicle position being updated appropriately according to characteristics or a level of the assistance control.

Means to Solve the Problem

The above-mentioned object is achieved by a vehicle positioning information updating system for updating positioning information concerning positioning of an own vehicle mounting an assistance control unit which carries out assistance control according to the own vehicle position, provided with an updating condition setting means configured to set an updating condition for updating the positioning information based on characteristics or a level of the assistance control by the assistance control unit; and an updating executing means configured to execute updating of the positioning information according to the updating condition set by the updating condition setting means.

In this configuration of the invention, the updating condition for the positioning information is set according to the characteristics or the level of the assistance control carried out according to the own vehicle position. Then, based on the updating condition, the positioning information is updated. In this configuration, the positioning information of the own vehicle has accuracy which is made to correspond to the characteristics or the level of the assistance control through the updating in appropriate timing. As a result, the assistance control can be carried out appropriately according to the own vehicle position.

In this case, in the above-mentioned vehicle positioning information updating system, the updating condition setting means may read a map prescribing a relationship between the assistance control unit and the updating condition for the positioning information, and may set the updating condition for the positioning information corresponding to the assistance control unit which is actually mounted in the own vehicle and execution of which is permitted.

Further, in the above-mentioned vehicle positioning information updating system, the assistance control unit may have an outputting means configured to output updating condition information indicating the updating condition for the positioning information required for the assistance control unit; and the updating condition setting means may receive the updating condition information output by the outputting means, and may set the updating condition for the positioning information.

Further, in the above-mentioned vehicle positioning information updating system, the positioning information may be data stored in a map database of the own vehicle, or may be an own vehicle position obtained from map matching.

Further, in the above-mentioned vehicle positioning information updating system, the updating condition for the positioning information may be a frequency of executing the updating, or may be an updating scope in a map database prescribed according to the assistance control unit mounted in the own vehicle.

Advantageous Effects of the Invention

According to the present invention, positioning information such as road map data or an own vehicle position is updated appropriately according to characteristics or a level of assistance control to carry out, and thus, the assistance control can be appropriately carried out.

DESCRIPTION OF THE REFERENCE NUMERALS

12 POSITIONING PART
14 ASSISTANCE CONTROL PART
26 MAP MATCHING PART
30 MAP DATABASE
40 ECU

BEST MODE FOR CARRYING OUT THE INVENTION

Below, a preferable embodiment of the present invention will be described.

Figure 1:
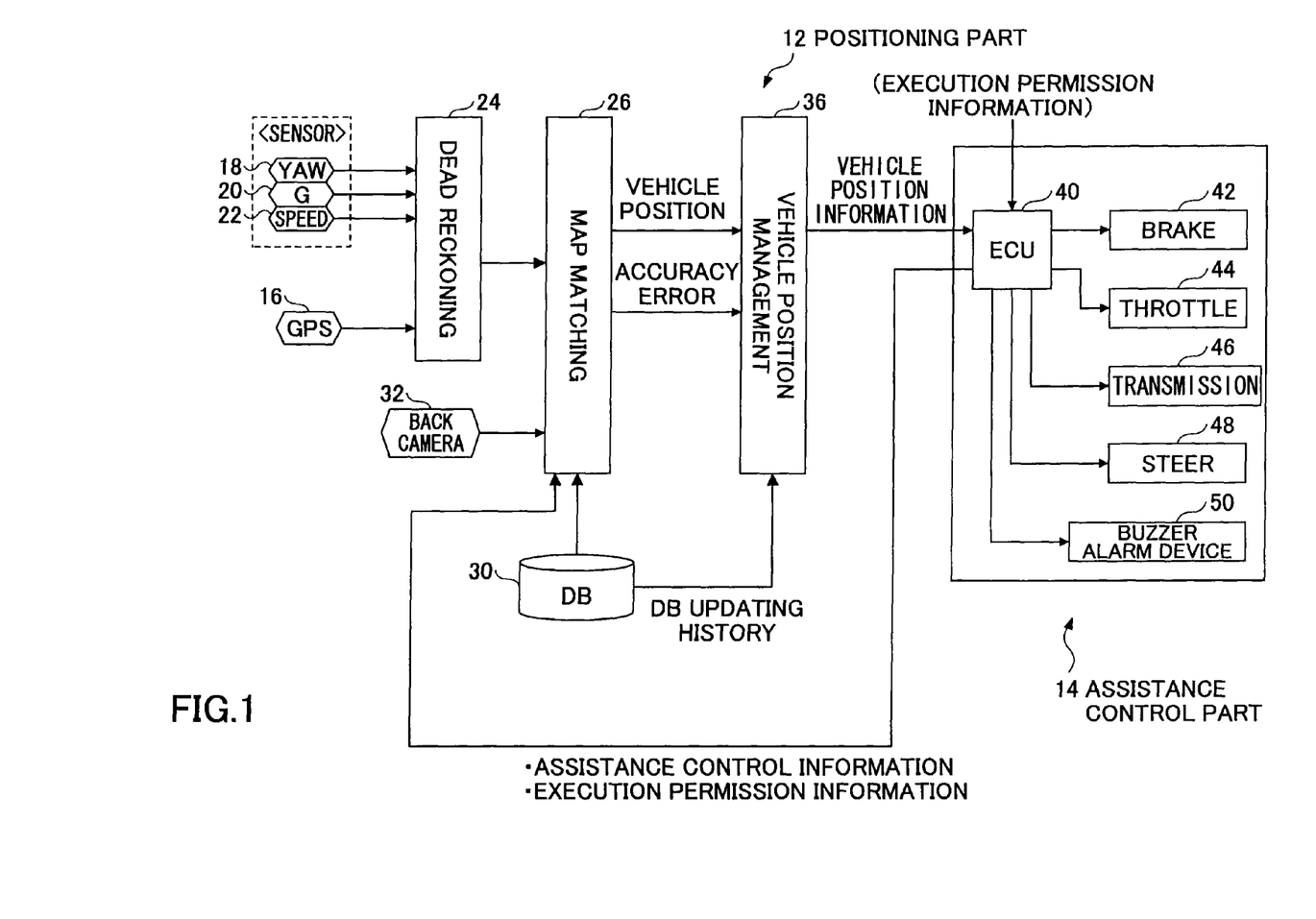
FIG. 1 shows a configuration of a system mounted in a vehicle in one embodiment of the present invention.

FIG. 1 shows a configuration of a system mounted in a vehicle in one embodiment of the present invention. As shown in FIG. 1, the system in the embodiment is provided with a positioning part 12 for measuring a position of the own vehicle, an assistance control part 14 for controlling running of the own vehicle or such. In this system, according to the position of the own vehicle which may vary in its accuracy error measured by the positioning part 12, the assistance control part 14 carries out predetermined assistance control upon running of the own vehicle.

The positioning part 12 has a GPS (Global Positioning System) receiver 16, a direction sensor 18, a G sensor 20 and a vehicle speed sensor 22. The GPS receiver 16 receives a GPS signal transmitted by a GPS satellite, and detects a longitude and a latitude of a position at which the own vehicle exists. The direction sensor 18 is a magnetic field sensor or a gyro sensor, and detects a yaw angle (direction) of the own vehicle. The G sensor 20 detects acceleration/deceleration of the own vehicle. The vehicle speed sensor 22 detects a speed of the own vehicle.

Outputs of these receiver and sensors 16 through 22 are connected to a dead reckoning part 24 configured mainly by a microcomputer. The output signals of the receiver and sensors 16 through 22 are provided to the dead reckoning part 24 respectively. The dead reckoning part 24 detects the longitude and latitude of a current position of the own vehicle (initial coordinate) based on information from the GPS receiver 16, and also, detects a running condition such as a running direction of the own vehicle based on information from the sensors 18 through 22. The dead reckoning part 24 then produces a running track (estimated track) from the initial coordinate of the own vehicle.

The positioning part 12 has a map matching part 26 configured mainly by a microcomputer connected with the dead reckoning part 24, and a map database 30 connected with the map matching part 26. The map database 30 is configured by a hard disk (HD), a DVD, or a CD mounted in the own vehicle or provided in a center. The map database 30 stores various map data such as link information of a road itself, a ground feature drawn or installed on the road, information concerning a traffic lane and so forth.

The map data stored in the map database 30 includes information of a longitude and a latitude indicating the road, the lane shape such as a curvature, a slope, the number of lanes, a width of the lane, existence/absence of a corner, a type of the road, shape data, paint data and position data of each ground feature such as a pedestrian crossing, a stop line, a running direction arrow, a diamond sign indicating "a pedestrian crossing occurs", a speed limit sign, a turn prohibition sign, distance data among the respective ground features and so forth. The map database 30 is such that map data stored therein can be updated to a newest one through replacement of the disk, as a result of an updating condition being met, or so.

To the map matching part 26, information of an estimated locus from the initial coordinate of the own vehicle position, produced for the purpose of map matching by the dead reckoning part 24 is provided. The map matching part 26 carries out map matching to correct the current position of the own vehicle onto a road link with the use of the link information of the road itself stored in the map database 30, each time when the information of the estimated locus is provided from the dead reckoning part 24.

The map matching part 26 reads, from the map database 30, map data of a road scope estimated to be run by the own vehicle within a predetermined time or within a predetermined distance from then, from the current position of the own vehicle obtained from the map matching. Then, by determining whether or not a ground feature to be recognized is drawn or installed within the predetermined road scope from the current position, it is determined whether or not an image picked up by means of a back camera described later should be recognized. Simultaneously, characteristic data such as shape data or position data of the ground feature, shape data of the running lane and so forth are provided.

The positioning part 12 has the back camera 32 connected with the map matching part 26. The back camera 32 is disposed on a vehicle rear bumper or such, and can pick up surroundings of a predetermined area including a road surface behind the vehicle from the position where it is disposed. The thus-picked-up image is provided to the map matching part 26 by the back camera 32.

When determining that the picked-up image from the back camera 32 should be recognized, the map matching part 26 detects the above-mentioned ground feature drawn on the road, the running lane, and so forth, and also, grasps a mutual positional relationship of the ground feature and so forth with respect to the own vehicle, by carrying out image processing such as edge extraction on the picked-up image when the picked image is provided by the back camera 32. It is noted that, when the ground feature and the running lane are thus detected, an area in which the ground feature and so forth occur may be previously determined based on the characteristic data such as the shape data or the position data of the ground feature and the running lane provided by the map database 30, and an area on which the image processing is to be carried out may be narrowed down selectively from the entire picked-up image from the back camera 32, in a view point of improving the efficiency.

The map matching part 26 calculates a position of the own lane corresponding to the own vehicle on the road which the own vehicle currently runs, based on the detection result for the running lane from the picked-up image of the back camera 32. Further, based on the extraction result for the ground feature, a mutual relationship (specifically, a distance from the own vehicle to the recognized ground feature) between the own vehicle and the recognized ground feature behind the own vehicle on the road is measured, and then, based on the measured result and the position data of the recognized ground feature stored in the map database 30, the position of the own vehicle is detected.

Each time when the information of the estimated locus is provided by the dead reckoning part 24 as mentioned above, the map matching part 26 carries out map matching to correct the current position of the own vehicle onto the road link stored in the map database 30, and also, when a ground feature is recognized from a picked-up image from the back camera 32, the map matching part 26 carries out map matching to correct the position of the own vehicle to a position which is based on the recognized ground feature of the recognition result. As will be described later, the map matching part 26 calculates correctness (i.e., a degree of self-confidence) which indicates accuracy of the current position of the own vehicle measured as a result of the map matching.

Further, the map matching part 26 compares with the map data stored in the map database 30 as a result of the position of the own vehicle being measured through the map matching, and, when it is thus determined that a target ground feature (for example, a stop line, an intersection, a curve approaching point or such) occurs which is a control target necessary to execute assistance control, in front in the running direction of the own vehicle, the map matching part 26 calculates, each time of the measurement after that, a distance along the center line of the running lane from the own vehicle to the target ground feature (referred to as an along-road remaining distance, hereinafter), based on a relationship between the thus-measured position of the own vehicle and the position of the target ground feature stored in the map database 30.

The positioning part 12 has a vehicle position management part 36 connected with the map matching part 26. To the vehicle position management part 36, a link ID or a link coordinate of the current position of the own vehicle obtained as a result of map matching calculated by the map matching part 26, information of the degree of self-confidence indicating position accuracy thereof, information of the running lane on which the own vehicle currently runs, information of the along-road remaining distance from the own vehicle and the target ground feature, are provided, together with information of time at which the information is obtained. Further, to the vehicle position management part 36, updating history information such as an elapsed time from updating, an updating condition and so forth for map data in the map database 30 is provided.

Based on the information thus provided from the map matching part 26, the vehicle positron management part 36 detects the measured current position of the own vehicle and the along-road remaining distance to the target ground feature, and also detects an error in accuracy indicating the degree of self-confidence for the measured current position of the own vehicle. The information of the current position of the own vehicle and the along-road remaining distance thus detected by the vehicle position management part 36 are provided to, for example, a navigation unit which the own vehicle has, and, is displayed schematically on a map displayed on a display device thereof.

The information of the current position coordinate of the own vehicle and the mutual relationship between the own vehicle and the target ground feature measured by the vehicle position management part 36 is provided to the assistance control part 14. The assistance control part 14 is provided with an electronic control unit (ECU) 40 configured mainly by a microcomputer, and carries out assistance control for a driver upon running of the own vehicle on a road, by the ECU 40.

The assistance control is carried out according to the position of the own vehicle. For example, the assistance control may include halting control which is driving assistance control for halting the own vehicle at a ground feature on a road such as a stop line, railroad crossing or such, when braking operation is not made by the driver or braking operation is late; intersection control which is driving assistance control for preventing the own vehicle from crossing another vehicle which is estimated to cross an intersection which is a ground feature on a road; speed control such that the own vehicle approaches a curve (corner) which is a ground feature at an appropriate speed; guidance control for carrying out routing assistance with the use of voice with respect to a relative distance to a target ground feature, or such.

The ECU 40 is connected with a brake actuator 42 for generating appropriate braking force in the own vehicle, a throttle actuator 44 for giving appropriate driving force to the own vehicle, shift actuator 46 for switching a transmission step of an automatic transmission, a steer actuator 48 for giving an appropriate steering angle to the own vehicle, and a buzzer alarm device 50 for sounding a buzzer, generating an alarm or generating a speaker output in the vehicle cabin. As will be described later, the ECU 40 provides appropriate driving commands to the respective actuators 42 through 50, based on the current position of the own vehicle and the mutual relationship between the own vehicle and the target ground feature measured and managed by the vehicle position movement part 36. The respective actuators 42 through 50 are driven according to the driving commands provided by the ECU 40.

Next, specific operation of the above-mentioned system will be described. In the present embodiment, the dead reckoning part 24 of the positioning part 12 produces the estimated locus of the own vehicle from the initial coordinate based on the output of the respective receiver and sensors 16 through 22, at predetermined intervals, and provides it to the map matching part 26. Each time when receiving the estimated locus information from the dead reckoning part 24, the map matching part 26 compares the estimated locus of the own vehicle from the initial coordinate produced by the dead reckoning part 24 with the link information of the road stored in the map database 30 as map data, and thus, carries out map matching to correct the current position of the own vehicle onto the road link.

The map matching part 26 reads, from the map database 30, map data of a road scope (all the lanes in a case of a plurality of lanes) estimated to be run by the own vehicle after that within a predetermined time or within a predetermined distance from the current position which is a result of the map matching, based on the result of the map matching. Then, it is determined whether or not a ground feature from the back camera 32 to be recognized occurs within the predetermined road scope, and it is determined whether or not the vehicle rear direction image with the back camera 32 should be recognized. It is noted that a reason why it is thus determined whether or not image recognition with the back camera 32 is required, from a position before a position at which the ground feature to be recognized exists, based on whether or not the ground feature to be recognized occurs within the predetermined road scope from the current position, is that, there is a possibility that the current position of the own vehicle detected as a result of the map matching is not accurate.

When no ground feature to be recognized occurs within the predetermined road scope as a result of the above-mentioned determination, the map matching part 26 carries out nothing. On one hand, when a ground feature to be recognized occurs within the predetermined road scope, the map matching part 26 carries out image processing such as edge extraction from a picked-up image of the back camera 32, extracts the ground feature to be recognized from the picked-up image of the back camera 32 based on a result of the image processing, and also, detects a mutual positional relationship of the ground feature with respect to the own vehicle. Then, when carrying out the detection, the map matching part 26 accesses the map database 30, reads position data of the recognized ground feature, and also, based on the mutual positional relationship between the own vehicle and the recognized ground feature detected, the map matching part 26 detects a position of the own vehicle. In this case, map matching of the position of the own vehicle to a position according to the ground feature recognized from the camera picked-up image is carried out.

When recognizing that the ground feature to be recognized occurs within the predetermined road scope, the map matching part 26 extracts the own lane in which the own vehicle runs from the camera picked-up image based on a result of the image processing of the back camera 32, and also, detects a mutual positional relationship of the own lane with respect to the own vehicle. At this time, further, the map matching part 26 accesses the map database 30, obtains a lane width of the running lane, the number of the lanes, a shape of the lane and so forth in the proximity to the own vehicle, and then, calculates a position of the own lane on the road on which the own vehicle currently runs.

When measuring the position of the own vehicle and calculating the own lane position on the road as mentioned above, the map matching part 26 determines whether or not a target ground feature necessary to carry out assistance control occurs in the own lane in front of the running direction of the own vehicle. When the target ground feature occurs as a result of the determination, the map matching part 26 reads position data of the target ground feature from the map database 30, and after that, calculates an along-road remaining distance to the target ground feature from the own vehicle based on a relationship between the detected own vehicle position and the target ground feature. Then, the map matching part 26 outputs and provides information of the along-road remaining distance with information of the time attached thereto, to the vehicle position management part 36. Further, each time when measuring the position of the own vehicle, the map matching part 26 calculates an accuracy error of the current position of the own vehicle measured at the time. Then, the map matching part 26 outputs and provides information of the measured current position of the own vehicle, together with information of the accuracy error, with information of the time attached thereto, to the vehicle position management part 36.

The vehicle position management part 36 detects the current position of the own vehicle or the along-road remaining distance calculated by the map matching part 26, and transmits information such as the vehicle position coordinate, the distance and time for the target ground feature, and so forth, to the ECU 40 of the assistance control part 14.

Based on the current position of the own vehicle, the distance and time for the ground feature for assistance control such as a stop line, an intersection, or such provided by the positioning part 12, the ECU 40 determines, for each set of assistance control, whether or not a control start condition is met which is determined for the control. When the control start condition is met, the ECU 40 starts the assistance control.

For example, for the stop control, automatic braking by the brake actuator 42 is started when the measured distance from the own vehicle to a stop line which is a target ground feature reaches 30 meters for example, and thus, the own vehicle is stopped on the stop line and the own vehicle is prevented from passing through the stop line. It is noted that, before the automatic braking is started by the brake actuator 42, a voice guidance or such for informing the driver that the automatic braking is carried out may be provided. Further, upon routing assistance with voice, such a guidance is provided that, a speaker output is provided from the buzzer alarm device 50 at a time at which the measured distance from the own vehicle to a target ground feature such as an intersection becomes 100 meters for example, so that the driver is made to know that the target ground feature occurs in front.

In measuring the current position of the vehicle or calculating the along-road remaining distance as mentioned above, the GPS receiver 16, the bearing sensor 18, the G sensor 30, the vehicle speed sensor 22 and, the back camera 32 are used. In this case, an error occurs in the vehicle position measurement result since errors in detection parameters in the receiver and the various sensors 16 through 22, and the camera 32, errors included in various calculations upon measuring the position (for example, a rounding error for timing) occur. This positioning error is integrated along with a movement of the vehicle. On one hand, in the present embodiment, the positioning part 12 carries out map matching such as to recognize the ground feature recognized from the picked-up image of the back camera 32, and to correct the position of the own vehicle. When the map matching is thus carried out, the position accuracy in the current position of the own vehicle thus measured becomes the best one accordingly, and the error becomes the smallest ones. Accordingly, the positioning error becomes larger as the movement distance of the vehicle after the map matching based on the recognition of the ground feature from the camera picked-up image becomes longer (see FIG. 2).

Figure 2:
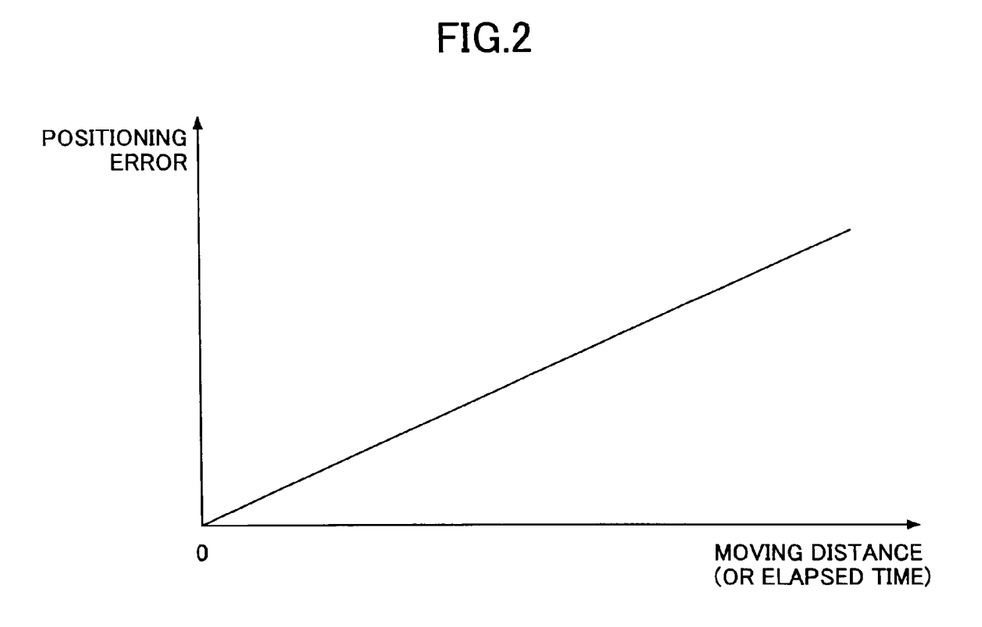
FIG. 2 shows a relationship between an elapsed time or a moving distance of a vehicle from previous updating, map matching or map database, and an accuracy error of positioning.

Further, in the present embodiment, the own vehicle position is measured with the use of the map data stored in the map database 30 which can be updated. When a time elapsed from the updating of the map database 30 becomes longer, the positioning error may change according to the updating condition/updating scope or the elapsed time/movement distance from the previous updating of the map database 30, since the map data stored in the map database 30 may become different from the actual one due to repair of a road, new construction of a road or such. Specifically, as the elapsed time or the movement distance after the previous updating of the map database 30 becomes longer, or as the updating condition is such that updating is not likely to occur, the positioning error becomes larger.

On one hand, the above-mentioned assistance control such as the stop control, intersection control, speed control, guidance control or such is such that, required accuracy in positioning the own vehicle position is different for each assistance control. For example, for the stop control or the intersection control, positioning in high accuracy (for example, within an error of 1 through 2 meters) is required since it is necessary to achieve avoidance by stopping on a stop line by means of braking, or by braking or steering within an intersection. In contrast thereto, for the routing assistance control, not so high accuracy is required since it is necessary to merely provide to the driver with information that a target ground feature (for example, an intersection to turn right) occurs in front. In this case, low accuracy (for example, an error of 40 through 50 meters) is sufficient in measuring the position.

Figure 3:
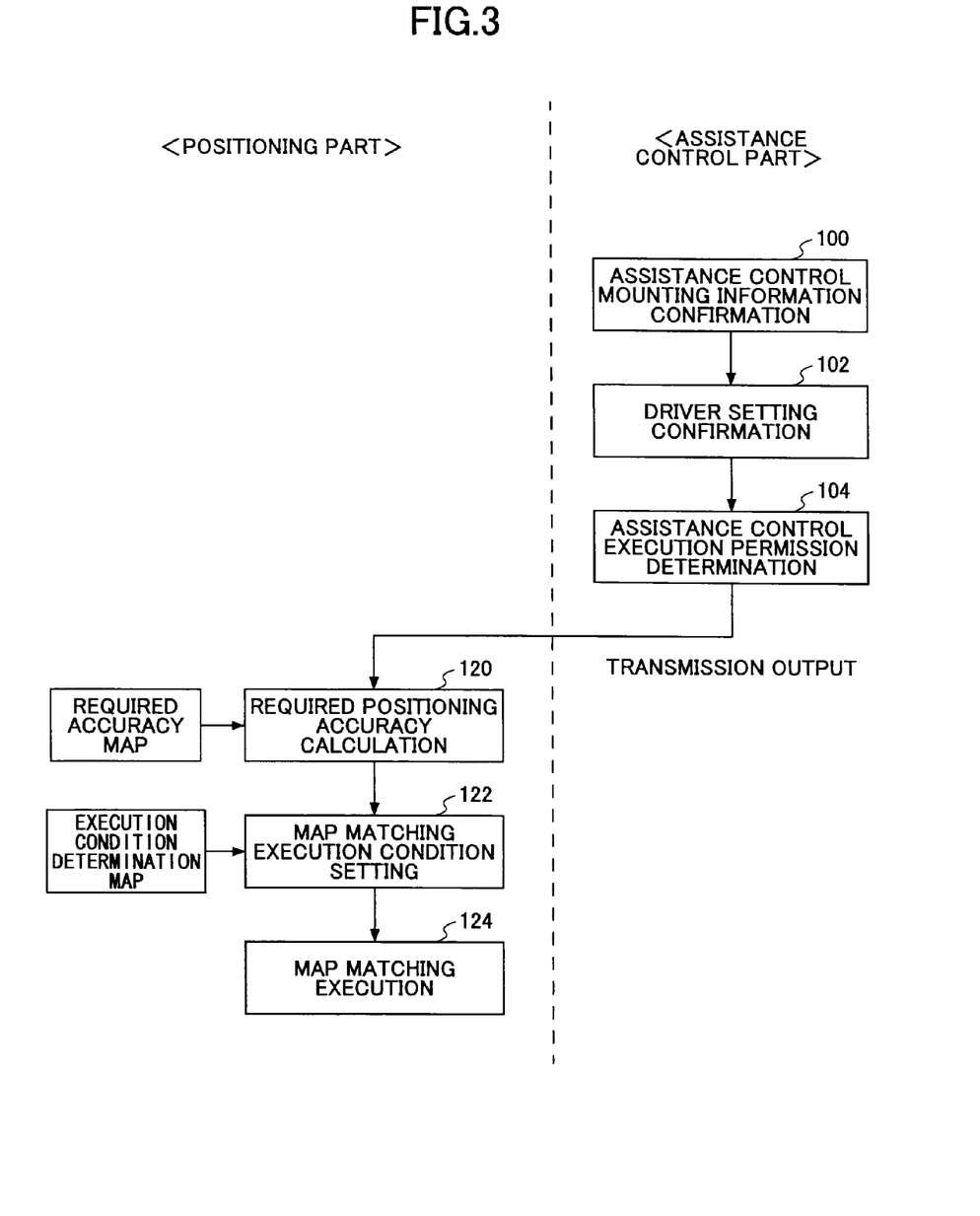
FIG. 3 shows a flow chart of one example of a control routine executed in the system in the embodiment.
Figure 4:
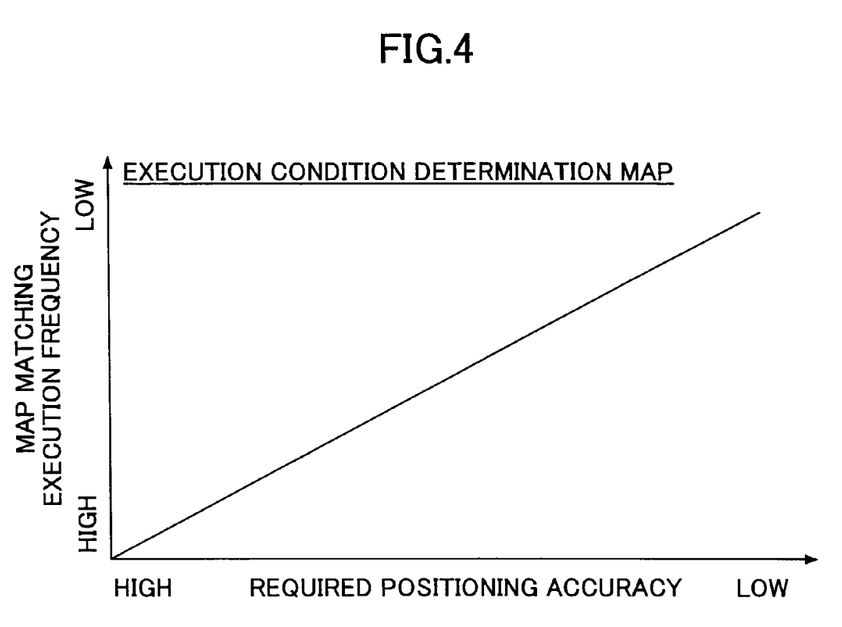
FIG. 4 shows a map prescribing a relationship between required positioning accuracy used in the system of the embodiment and an execution frequency of map matching.
Figure 5:
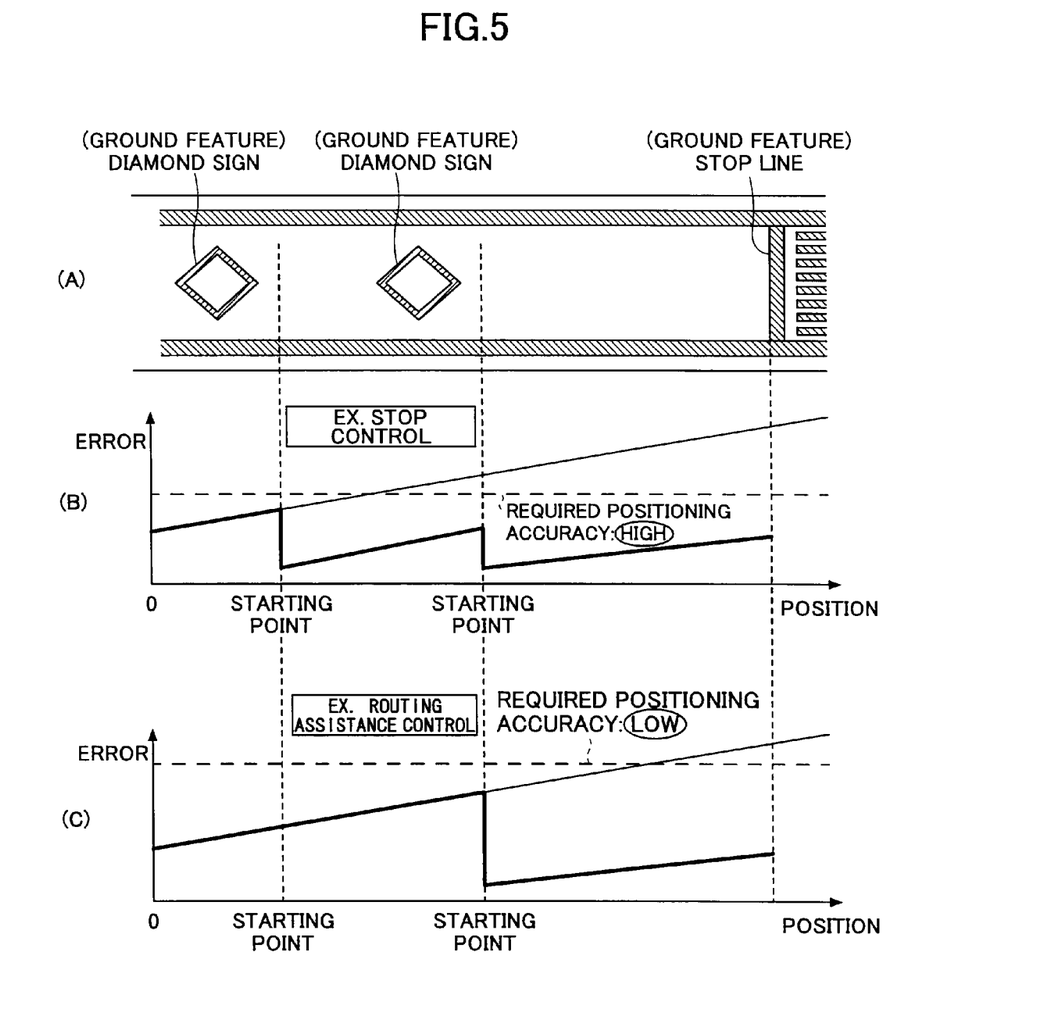
FIG. 5 shows an advantage in the system of the embodiment.

FIG. 3 shows a flow chart of a control routine executed in the system of the present embodiment. FIG. 4 shows a map prescribing a relationship between required positioning accuracy and an execution frequency of map matching, in the assistance control used in the system of the present embodiment. FIG. 5 illustrates an advantage in the system of the present embodiment.

In the present embodiment, the ECU 40 in the assistance control part 14 previously stores information (for example, the above-mentioned stop control or such, which may be different for each vehicle or each vehicle type) of the assistance control mounted in the own vehicle or information of assistance control which is not mounted in the own vehicle.

Further, the vehicle driver may set as to whether or not to permit execution of the executable assistance control for each set thereof, with predetermined switching operation. To the ECU 40, information indicating whether or not execution of the executable assistance control is permitted according to an intention of the driver is thus input. The ECU 40 determines whether or not execution of each set of assistance control is permitted (Step 104) based on the thus-input information, when the information is input (Steps 100, 102).

The information indicating whether not the assistance control is mounted in the own vehicle and whether or not execution of the assistance control is permitted is output and transmitted to the positioning part 12. In the positioning part 12, for each set of assistance control, information of accuracy in positioning required for appropriately executing the assistance control is previously stored as a required accuracy map. It is noted that the stored information of the required positioning accuracy may be one prescribing an error range in a specific unit of length (meter), or, one prescribing the error range with an accuracy level abstractly indicating a degree of a range of the length. For example, the positioning accuracy may be such as, for the above-mentioned stop control, 2 meters or a level 1 indicating that the error is smallest, while, for the above-mentioned routing assistance control, 50 meters, or a level n indicating that the error is largest.

The positioning part 12 identifies the assistance control mounted in the own vehicle based on the information of the assistance control mounted in the own vehicle and the information of execution permission, thus provided from the ECU 40 of the assistance control 14, and also, for each set of the thus-identified assistance control, calculates the required positioning accuracy with referring to the above-mentioned required accuracy map (Step 120). Then, based on the required positioning accuracy for each assistance control mounted in the own vehicle and, for which execution is permitted by intention of the driver, the positioning part 12 sets a execution condition for always ensuring the required positioning accuracy, which is a requirement for executing the above-mentioned map matching, i.e., a correction condition which is a requirement for correcting the own vehicle position (Step 122).

It is noted that the positioning part 12 previously stores an execution condition determination map prescribing a relationship between the required positioning accuracy and the map matching execution condition, and then, for setting the map matching execution condition, the positioning part 12 reads the execution condition determination map. As mentioned above, the accuracy error in the positioning changes according to the execution frequency and/or the elapsed time/moving distance from the previous execution of map matching, and, as the execution frequency is smaller, or the elapsed time is longer, that is, the moving distance is longer, the accuracy error becomes larger. Therefore, in consideration of the change, the above-mentioned execution condition determination map is previously estimated experimentally and logically, and, is set so that, as the required positioning accuracy is higher, the map matching execution condition is more likely to be executed (for example, in FIG. 4, the execution frequency is higher), and, also, as the required positioning accuracy is lower, the map matching execution condition is less likely to be executed (the execution frequency is lower).

Specifically, when the required positioning accuracy is on the order of 2 meters, and the assistance control is mounted in the own vehicle and execution thereof is permitted, the positioning part 12 selects the positioning accuracy of 2 meters, and sets the execution frequency to execute the map matching corresponding to the positioning accuracy of 2 meters (for example, every time when the vehicle runs for 1 kilometer). Further, when the required positioning accuracy is on the order of 40 meters, and the assistance control is mounted in the own vehicle and execution thereof is permitted, the positioning part 12 selects the positioning accuracy of 40 meters, and sets the execution frequency to execute the map matching corresponding to the positioning accuracy of 40 meters (for example, every time when the vehicle runs for 20 kilometers).

Further, when a plurality of sets of assistance control having different required positioning accuracies are mounted in the own vehicle, and execution thereof is permitted, the highest one of the respective required positioning accuracies of the plurality of sets of assistance control is selected, and the execution frequency to execute the map matching is set corresponding to the highest positioning accuracy. Specifically, when two sets of assistance control, i.e., the stop control requiring the high positioning accuracy on the order of 2 meters and the routing assistance control requiring the low positioning accuracy on the order of 40 meters are mounted in the vehicle and execution thereof is permitted, the positioning accuracy of 2 meters corresponding to the stop control requiring the higher positioning accuracy of both sets of control is selected, and the map matching execution frequency corresponding to the positioning accuracy is set.

When setting the map matching execution condition corresponding to the positioning accuracy as mentioned above upon system starting up, the positioning part 12 after that carries out map matching to correct the position of the own vehicle which is measured each time, according to the set execution condition to prevent the map matching execution condition from being not met (Step 124).

Specifically, first, immediately after the system is started up, the map matching part 26 reads from the map database 30 map data of a road scope estimated to run within a predetermined time or within a predetermined distance from the current position based on a result of the map matching, and determines whether or not a ground feature to be recognized by the own vehicle stored in the map data within the predetermined road scope occurs. When determining that the ground feature to be recognized occurs, after that, image processing is carried out on a picked-up image behind the vehicle provided by the back camera 32, the ground feature to be recognized is thus recognized from the picked-up image, and thus, map matching is carried out to correct the own vehicle position to a position according to the ground feature recognized.

Further, next, after once the map matching is thus carried out to correct the own vehicle position to the position according to the ground feature recognized, the map data within the road scope estimated to run by the own vehicle from then within s distance or a time corresponding to the map matching execution condition (for example, the execution frequency) set as mentioned above is read from the map database 30, and a ground feature which is farthest spatially or temporally is selected therefrom. Then, until the own vehicle approaches the thus-selected ground feature within a predetermined scope, image recognition from a picked-up image behind the vehicle from the back camera 32 is not carried out, and correction of the own vehicle positron based on a recognized ground feature is not carried out even when a ground feature stored in the map data occurs before the above-mentioned selected ground feature. On one hand, when the own vehicle approaches the selected ground feature within the predetermined scope, image recognition with a picked-up image behind the vehicle from the back camera 32 is carried out, and map matching to correct the own vehicle position is carried out based on the recognized ground feature. After that, map matching is carried out in the same manner according to the set map matching execution condition.

Thus, in the system of the present embodiment, the assistance control which is actually mounted in the own vehicle and execution of which is permitted is identified, then, the positioning accuracy required for appropriately carrying out the assistance control is obtained, and the map matching execution condition for always ensuring the required positioning accuracy can be set. When a plurality of sets of assistance control are actually mounted in the own vehicle and execution thereof is permitted, the highest required positioning accuracy of the respective positioning accuracies required for the plurality of sets of assistance control can be selected, and the map matching execution condition for always ensuring the selected required positioning accuracy can be set. This map matching execution condition thus set when the plurality of sets of assistance control exist can always ensure also the required positioning accuracies of the other sets of assistance control having the lower positioning accuracies other than the selected required positioning accuracy.

That is, in the system of the present embodiment, when the assistance control which is actually mounted in the own vehicle and for which execution is permitted is different, the map matching execution condition to be set can be changed according to the assistance control, specifically, according to the positioning accuracy required for the assistance control. Then, map matching to correct the own vehicle position to a position based on a recognized ground feature can be carried out according to the map matching execution condition set according to the assistance control which is actually mounted in the own vehicle and execution of which is permitted.

By this configuration, map matching to correct the own vehicle position based on a recognized ground feature is carried out relatively frequently when the positioning accuracy required for the assistance control which is mounted in the own vehicle and execution of which is permitted is relatively high as shown in FIG. 5 (B). Further, map matching to correct the own vehicle position based on a recognized ground feature is carried out not so frequently when the positioning accuracy required for the assistance control which is mounted in the own vehicle and execution of which is permitted is relatively low as shown in FIG. 5 (C). In any case, map matching to correct the own vehicle position is executed before the actual positioning accuracy error exceeds the required positioning accuracy.

In this point, according to the system of the present embodiment, it is possible to always ensure the positioning accuracy of the own vehicle position in a state appropriately corresponding to the assistance control, as a result of the correction updating of the own vehicle position being carried out in timing according to the characteristics and/or the level of the assistance control which is mounted in the own vehicle and execution of which is permitted. Thereby, it is possible to approximately carry out the assistance control according to the own vehicle position.

It is noted that in the above-mentioned embodiment, the positioning part 12 corresponds to 'vehicle positioning information updating system' claimed, the assistance control part 14 corresponds to 'assistance control unit' claimed, the positioning accuracy required for appropriately carrying out each assistance control corresponds to 'characteristics' or 'level' claimed, the own vehicle position obtained from map matching corresponds to 'positioning information' claimed, the execution condition map prescribing the relationship between the positioning accuracy required for the assistance control and the map matching execution condition corresponds to 'map' claimed, the map matching execution frequency corresponds to 'updating condition' and 'frequency of executing the updating' claimed, and the information indicating whether or not the assistance control is mounted and the information of whether or not execution of the assistance control is permitted corresponds to 'updating condition information' claimed.

Further, in the above-mentioned embodiment, 'updating condition setting means' claimed is achieved as a result of the positioning part 12 carrying out Step 122 in the routine shown in FIG. 3, 'updating executing means' claimed is achieved as a result of the positioning part 12 carrying out processing of Step 124, and 'outputting means' claimed is achieved as a result of the assistance control part 14 outputting and transmitting a processing result of Step 104 to the positioning part 12.

The system in the embodiment mentioned above calculates the positioning accuracy required for the assistance control mounted in the own vehicle and execution of which is permitted, then, the map execution condition of map matching to correct the own vehicle position to a position based on a recognized ground feature is set in such a manner that the required positioning accuracy is always ensured. However, the present invention is not limited thereto. An updating condition to update the map data stored by the map database 30 mounted in the own vehicle may be set in such a manner that the positioning accuracy required for the assistance control is ensured.

In the system of this variant embodiment, the positioning part 12 previously stores a map prescribing a relationship between the required positioning accuracy and an updating condition for the map database 30, then, the map is referred to, and the updating condition for the map database 30 is set based on the required positioning accuracy of the assistance control. It is noted that in consideration of the positioning accuracy error changing according to the updating frequency or the elapsed time/moving distance from the previous updating, the above-mentioned map is set in such a manner that, as the required positioning accuracy is higher, the updating condition for the map database 30 is such that updating is more likely to be carried out (for example, the updating frequency is higher), and as the required positioning accuracy is lower, the updating condition for the map database 30 is such that updating is less likely to be carried out (for example, the updating frequency is lower).

Then, when the updating condition for the map database 30 is thus set, updating of the map database 30 (for example, a map data delivery request to the center, an alarm output to the driver to urge the driver to update the map database 30, or such) is carried out according to the updating condition. In this system, updating of the map database 30 is carried out relatively frequently when the positioning accuracy required for the assistance control mounted in the own vehicle and execution of which is permitted is high, while, when the positioning accuracy is relatively low, the updating is carried out not so frequently. In any case, the updating can be carried out before the actual positioning accuracy error exceeds the error corresponding to the required positioning accuracy. Accordingly, it is possible to always maintain the positioning accuracy of the own vehicle position in a state appropriately according to the assistance control mounted in the own vehicle, and thereby, the assistance control can be carried out appropriately according to the own vehicle position.

Further, in the above-mentioned embodiment, the required positioning accuracy is calculated for each set of assistance control mounted in the own vehicle and execution of which is permitted, the highest one of the required positioning accuracies thereof is selected so that the required positioning accuracies thereof are always ensured, and the map matching execution condition (actually, the execution frequency) is set. However, in a system such as that of the above-mentioned variant embodiment in which the updating condition for the map database 30 is set, a ground feature (for example, only a stop line or a diamond sign in front to recognize in the stop control, only an intersection for the routing assistance control, or such) necessary to carry out the assistance control may be set previously as a map for each set of assistance control, then, an updating scope in the map database 30 prescribed to correspond to the assistance control mounted in the own vehicle and execution of which is permitted may be set as the updating condition, and updating of the map database 30 may be carried out only on the updating scope. For example, in the vehicle in which the stop control is carried out, when the map database 30 is updated, only map data indicating a ground feature required when the stop control is carried out is updated. In this configuration, the stop control according to the own vehicle position can be appropriately carried out.

In this case, the ground feature required when the assistance control is carried out correspond to 'characteristics' or 'level' claimed, the map data stored in the map database 30 corresponds to 'positioning information' claimed, and the updating scope in which the map database 30 storing the map data is updated corresponds to 'updating condition' claimed.

Further, in the above-mentioned embodiment, corresponding to the assistance control mounted in the own vehicle and execution of which is permitted (specifically, corresponding to the positioning accuracy required for the assistance control), the execution condition for map matching to correct the own vehicle position to a position based on a recognized ground feature is set, and then, after the system is started up, map matching is carried out within a road scope, which is estimated to run by the own vehicle for the distance or time corresponding to the execution condition based on the initial coordinate of the own vehicle position actually detected. However, when a target ground feature (for example, a stop line) which is used as a base for carrying out the assistance control mounted in the own vehicle and execution of which is permitted is previously set, map matching may be carried out within a road scope on this side of the target ground feature by the distance or the time corresponding to the execution condition based on the target ground feature, and, the map matching is carried out in sequence, every the distance or the time, retroactively.

Further, in the above-mentioned embodiment, after the execution condition for map matching corresponding to the assistance control mounted in the own vehicle and execution of which is permitted, map matching is carried out based on a recognized ground feature according to the execution condition on the basis of certain time, without calculating the actual positioning accuracy. However, after the setting of the execution condition, the positioning accuracy in measuring the position of the own vehicle may be calculated actually, and then, map matching is carried out before the calculated positioning accuracy exceeds the required positioning accuracy which is the basis of the execution condition. Also in this configuration, map matching can be carried out before the actual positioning accuracy exceeds the error corresponding to the required positioning accuracy according to the set execution condition. As a result, it is possible to always maintain the positioning accuracy of the own vehicle position in a state appropriately according to the mounted assistance control mounted, and thereby, the assistance control can be carried out appropriately according to the own vehicle position.

Further, the above-mentioned embodiment is the system in which the plurality of sets of assistance control are executed by the single assistance control part 14, and the single assistance control part 14 outputs and transmits to the positioning part 12 the information indicating whether or not the sets of assistance control are mounted in the own vehicle and whether or not execution of the assistance control is permitted. However, a system may be such that the assistance control part may be provided for each set of assistance control, and each assistance control part outputs and transmits to the positioning part 12 the information indicating whether or not the corresponding set of assistance control is mounted in the own vehicle and whether or not execution thereof is permitted.

Further, in the above-mentioned embodiment, in the system in which the single assistance control part 14 carries out the plurality of sets of assistance control, information indicating whether or not each assistance control is mounted and information indicating whether or not execution of the assistance control is permitted is output to the positioning part 12, and the positioning part 12 calculates the required positioning accuracy for each set of assistance control mounted in the own vehicle and execution of which is permitted, then, the highest one of the respective requested positioning accuracies thereof is selected so that these required positioning accuracies are always ensured, and the execution condition for the map matching is set. However, instead of the positioning part 12, the assistance control part 14 may store the above-mentioned required accuracy map, the assistance control part 14 may calculate the required positioning accuracy for each set of assistance control mounted in the own vehicle and execution of which is permitted, then, may select the highest one of the respective requested positioning accuracies thereof so that these required positioning accuracies are always ensured, and may output and transmit information of the highest required positioning accuracy to the positioning part 12, and the positioning part 12 may set the execution condition for the map matching according to the highest positioning accuracy. In this case, the information of the required highest positioning accuracy output and transmitted to the positioning part 12 by the assistance control part 14 corresponds to 'updating condition information' claimed.

Further, in the above-mentioned embodiment, the back camera 32 disposed at the rear part of the vehicle is used to recognize a ground feature, and map matching is carried out to correct the own vehicle position to a position based on the recognized ground feature. However, the recognition of a ground feature for carrying out map matching, may be carried out based on a picked-up image of a camera disposed at a front part of the vehicle or information transmitted from an external infrastructure.

Further, in the above-mentioned embodiment, the map database 30 is mounted in the vehicle. However, the map database may be provided in the center, and the vehicle may communicate with and access the center each time to read data stored in the map database.

Further, in the above-mentioned embodiment, as the sets of assistance control, the stop control, the intersection control, the speed control and the guidance control are cited. However, it is also possible to apply to another system which carries out other control which is executed according to the position of the own vehicle.

The present International Application claims priority based on Japanese Patent Application No. 2006-136934 filed May 16, 2006, and the entire contents of the Japanese Patent Application are hereby incorporated herein by reference in the present International Patent Application.

The invention claimed is:

1. A vehicle positioning information updating system for updating positioning information concerning positioning of an own vehicle mounting an assistance control unit which carries out assistance control according to the own vehicle position, comprising:
   an updating condition setting unit configured to set an updating condition for updating the positioning information based on characteristics or a level of the assistance control by the assistance control unit; and
   an updating executing unit configured to execute updating of the positioning information according to the updating condition set by the updating condition setting unit, wherein:
   the characteristics or the level of the assistance control by the assistance control unit comprises accuracy in positioning required for executing the assistance control by the assistance control unit,
   the updating condition for the positioning information comprises a frequency of executing the updating the positioning information, and
   the positioning information comprises the own vehicle position obtained from map matching or map data stored in a map database of the own vehicle.

2. The vehicle poisoning information updating system as claimed in claim 1, wherein:
   the updating condition setting unit reads a map prescribing a relationship between the assistance control unit and the updating condition for the positioning information, and sets the updating condition for the positioning information corresponding to the assistance control unit which is actually mounted in the own vehicle and execution of which is permitted.

3. The vehicle positioning information updating system as claimed in claim 1, wherein:
   the assistance control unit has an outputting unit configured to output updating condition information indicating the updating condition for the positioning information required for the assistance control unit; and
   the updating condition setting unit receives the updating condition information output by the outputting unit, and sets the updating condition for the positioning information.

4. A vehicle positioning information updating system for updating positioning information concerning positioning of an own vehicle mounting an assistance control unit which carries out assistance control according to the own vehicle position, comprising:
   an updating condition setting unit configured to set an updating condition for updating the positioning information based on characteristics or a level of the assistance control by the assistance control unit; and
   an updating executing unit configured to execute updating of the positioning information according to the updating condition set by the updating condition setting unit, wherein:
   the characteristics or the level of the assistance control by the assistance control unit comprise a ground feature required for executing the assistance control by the assistance control unit, and
   the updating condition for the positioning information comprises an updating scope in a map database prescribed according to the assistance control unit mounted in the own vehicle.

5. The vehicle positioning information updating system as claimed in claim 1, wherein:
   the frequency of executing the updating is based on an elapsed time from a prior executing of the updating.

6. The vehicle positioning information updating system as claimed in claim 1, wherein:
   the frequency of executing the updating is based on a moving distance from a prior executing of the updating.

7. A vehicle positioning information updating system for updating positioning information concerning positioning of an own vehicle mounting an assistance control unit which carries out assistance control according to the own vehicle position, comprising:
   updating condition setting means for setting an updating condition for updating the positioning information based on characteristics or a level of the assistance control by the assistance control unit; and
   updating executing means for executing updating of the positioning information according to the updating condition set by the updating condition setting means, wherein:
   the characteristics or the level of the assistance control by the assistance control unit comprises accuracy in positioning required for executing the assistance control by the assistance control unit,
   the updating condition for the positioning information comprises a frequency of executing the updating, and
   the positioning information comprises the own vehicle position obtained from map matching or map data stored in a map database of the own vehicle.

* * * * *